(12) United States Patent
Strong et al.

(10) Patent No.: US 9,990,574 B2
(45) Date of Patent: Jun. 5, 2018

(54) HOLDER FOR RFID ENABLED CARDS

(71) Applicants: Joseph James Strong, Barrington, RI (US); Robert Robertson, III, Barrington, RI (US)

(72) Inventors: Joseph James Strong, Barrington, RI (US); Robert Robertson, III, Barrington, RI (US)

( * ) Notice: Subject to any disclaimer, the term of this patent is extended or adjusted under 35 U.S.C. 154(b) by 0 days. days.

(21) Appl. No.: 15/354,199

(22) Filed: Nov. 17, 2016

(65) Prior Publication Data
US 2017/0372181 A1 Dec. 28, 2017

Related U.S. Application Data

(60) Provisional application No. 62/386,304, filed on Nov. 27, 2015.

(51) Int. Cl.
*G06K 19/02* (2006.01)
*G06K 19/077* (2006.01)
*A45C 11/18* (2006.01)

(52) U.S. Cl.
CPC ..... *G06K 19/022* (2013.01); *G06K 19/07722* (2013.01); *G06K 19/07743* (2013.01); *A45C 11/182* (2013.01); *A45C 2011/186* (2013.01)

(58) Field of Classification Search
CPC ....... G06K 19/07327; G06K 19/07749; G06K 19/07735; G06K 19/0723; H05K 9/0081; H04B 1/3888; H01Q 1/526; B32B 2519/02
USPC .......................................................... 235/488
See application file for complete search history.

(56) References Cited

U.S. PATENT DOCUMENTS

| 5,034,724 A | * | 7/1991 | Tone | G08B 21/24 |
| | | | | 200/61.19 |
| 5,941,375 A | * | 8/1999 | Kamens | A45C 11/182 |
| | | | | 150/147 |
| 6,121,544 A | * | 9/2000 | Petsinger | G06K 19/005 |
| | | | | 150/147 |

(Continued)

FOREIGN PATENT DOCUMENTS

| GB | 2528316 A | * | 1/2016 | ........... A45C 11/182 |
| JP | 2005296591 | | 10/2005 | |

OTHER PUBLICATIONS

Chapman, Daniel, Wallet to Combat Card Clash, Designed by UK Entrepreneur, www.get2press.com, Jun. 15, 2015, <www.get2press.com.au/default.asp?show=showpm&pmid=8628>.

(Continued)

*Primary Examiner* — Claude J Brown
(74) *Attorney, Agent, or Firm* — UConn IP Law Clinic; Andrew Siuta; Christopher Holshouser (57) ABSTRACT

A holder for cards providing RFID protection is disclosed herein. The holder comprises multiple sheaths, where each sheath has a card position adjacent a protective assembly and a means for holding the card adjacent the protective assembly. Each protective assembly comprises a conductive layer and an absorbing layer adjacent the card position. The sheaths are hingedly connected to enable the user to select a single card for desired use without the need to remove the card from the holder. Once the desired card read has been completed, the cards within the holder are shielded from unauthorized or malicious card reads.

15 Claims, 9 Drawing Sheets

(56) References Cited

U.S. PATENT DOCUMENTS

| | | | |
|---|---|---|---|
| 6,184,788 B1* | 2/2001 | Middlemiss | A45C 11/184 340/522 |
| 7,889,056 B2 | 2/2011 | Horne | |
| 8,305,193 B2 | 11/2012 | Horne | |
| 9,192,217 B1* | 11/2015 | Vargas | A45C 13/02 |
| 9,524,458 B2* | 12/2016 | Colby | G06K 19/0723 |
| 2005/0236489 A1* | 10/2005 | Droz | G06K 19/025 235/487 |
| 2006/0187055 A1 | 8/2006 | Colby | |
| 2006/0187061 A1* | 8/2006 | Colby | G06K 19/025 340/572.8 |
| 2006/0254815 A1* | 11/2006 | Humphrey | H05K 9/00 174/380 |
| 2006/0290501 A1 | 12/2006 | Hammad et al. | |
| 2007/0090954 A1* | 4/2007 | Mahaffey | G06K 19/07327 340/572.3 |
| 2007/0164866 A1* | 7/2007 | Robin | G06K 19/025 340/572.7 |
| 2007/0284264 A1* | 12/2007 | Davis | A45C 11/182 206/39 |
| 2007/0289775 A1 | 12/2007 | Potts | |
| 2008/0303632 A1* | 12/2008 | Hammad | G06F 1/1616 340/10.1 |
| 2009/0026751 A1* | 1/2009 | Rancien | G06K 19/005 281/29 |
| 2009/0067150 A1* | 3/2009 | Ito | A45C 11/182 361/818 |
| 2011/0268925 A1 | 11/2011 | Kagawa | |
| 2012/0228168 A1* | 9/2012 | Kitchen | A45C 11/182 206/307 |
| 2013/0270347 A1* | 10/2013 | Wernke | A45C 11/182 235/486 |
| 2014/0034520 A1* | 2/2014 | Scicluna | A45C 1/00 206/37 |
| 2014/0311636 A1* | 10/2014 | Jordan | A45C 1/06 150/133 |
| 2014/0366250 A1* | 12/2014 | Barone | A41D 27/205 2/251 |
| 2016/0285171 A1* | 9/2016 | Moylan | H01Q 17/007 |
| 2016/0374442 A1* | 12/2016 | Zhang | A45C 11/182 150/147 |

OTHER PUBLICATIONS

Flux Utmost, FLUX BIZ/RF Interference Prevention Separator, Nov. 11, 2016, <www.amazon.com/gp/product/B006AZZBU8/ref=s9_dcacsd_bhz_bw_c_x_1 >.

* cited by examiner

HOLDER FOR RFID ENABLED CARDS

CROSS-REFERENCE TO RELATED APPLICATIONS

This application claims priority to U.S. Provisional Application No. 62/386,304 filed on Nov. 27, 2015 which is incorporated herein by reference in its entirety

BACKGROUND

In the world where rapid transactions have become the norm, contactless card payments are becoming more prevalent. It is common to encounter access, identification, tracking, purchasing or other cards that are RFID (radio frequency identification) or NFC (near field communication) enabled. Hereinafter we will refer to both such type of cards collectively as RFID activated cards. In busy terminals or quick checkout lines, being able to just tap your card to pay two dollars has become a convenience that many people have begun to enjoy. Nevertheless, problems have arisen with these wireless transactions.

The first problem is wireless data theft. Card readers can be utilized to remotely collect a card's data through the air, for example on a crowded public transportation vehicle This theft can allow criminals to steal the card's information, without the card owner even being aware that the data on his card has been misappropriated.

A second problem is 'card-clash'. This phenomenon results when two or more RFID cards are read by the same reader, although the user only intends one card to be read. This could result in the customer being charged on each card, therefore paying double what they should have. Card clash can also prevent the intended card reader, such as a subway turnstile, from deciphering either signal, preventing the cardholder from using either card.

In the current state of the art, wallets have been designed that prevent outside sources from maliciously reading the card's information. However, these wallets render the card unreadable for contactless payment when inside the wallet, and each card must be removed so as to enable the card to be used. There are also wallets that allow for a single card to be on the outside of this protection, so it may be used without removing the card from the wallet. This device however, limits the availability to the single card positioned on the outside of the wallet. Further, this device does not provide complete protection for data theft for the exposed card.

There is therefore a need to address the deficiencies of the art and to provide a card holder that enables the user to protect multiple cards from data theft, and also enables a user to use multiple cards without the need to remove each one from the holder in order to prevent card clash.

SUMMARY OF THE INVENTION

The shortcomings of the prior art are overcome and additional advantages are provided through the card holder for RFID enabled cards disclosed herein. In one aspect, a holder for RFID activated cards comprises at least a first sheath and a second sheath, said first and second sheaths forming the outer most sheaths of the holder. Each sheath further comprises a front and a back, each having a perimeter, a protective assembly, a card position adjacent said protective assembly, and means for positioning a card adjacent said protective assembly. The protective assembly comprises a conductive layer adjacent an absorbing layer, wherein said absorbing layer is also adjacent said card position, and wherein said protective assembly has a perimeter. Said conductive layer and absorbing layer each have a perimeter and are preferably sized to be at least coextensive with the card position. The sheaths are hingedly connected to enable the sheaths to move relative to each other, to enable one side of a card positioned in a sheath to be isolated from other cards within said holder and therefore readable, and to enable the sheaths to be stacked in a first position when the cards are not in use and the holder is closed.

In another aspect, the holder further comprises an additional conductive layer external to and adjacent the front of said second sheath and preferably also external to and adjacent the back of said first sheath. These additional conductive external layers are hingedly connected to the sheaths and preferably form a unitary protective shell that is at least coextensive with the size of the front of said second sheath the back of said first sheath. In this way, said unitary protective shell covers the sheaths when the sheaths are stacked in a first position, thereby preventing malicious data appropriation from the cards within the holder when the holder is closed.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

The RFID protecting card holder is designed to protect against identity theft from the outside of the holder and also allow for easy contactless card payment with several cards. Another main function of the card holder is that contactless payment may be made with any number of different cards for different situations, and never requires removal of the cards from the holder. This allows for a quick and painless payment method.

Figure 1:
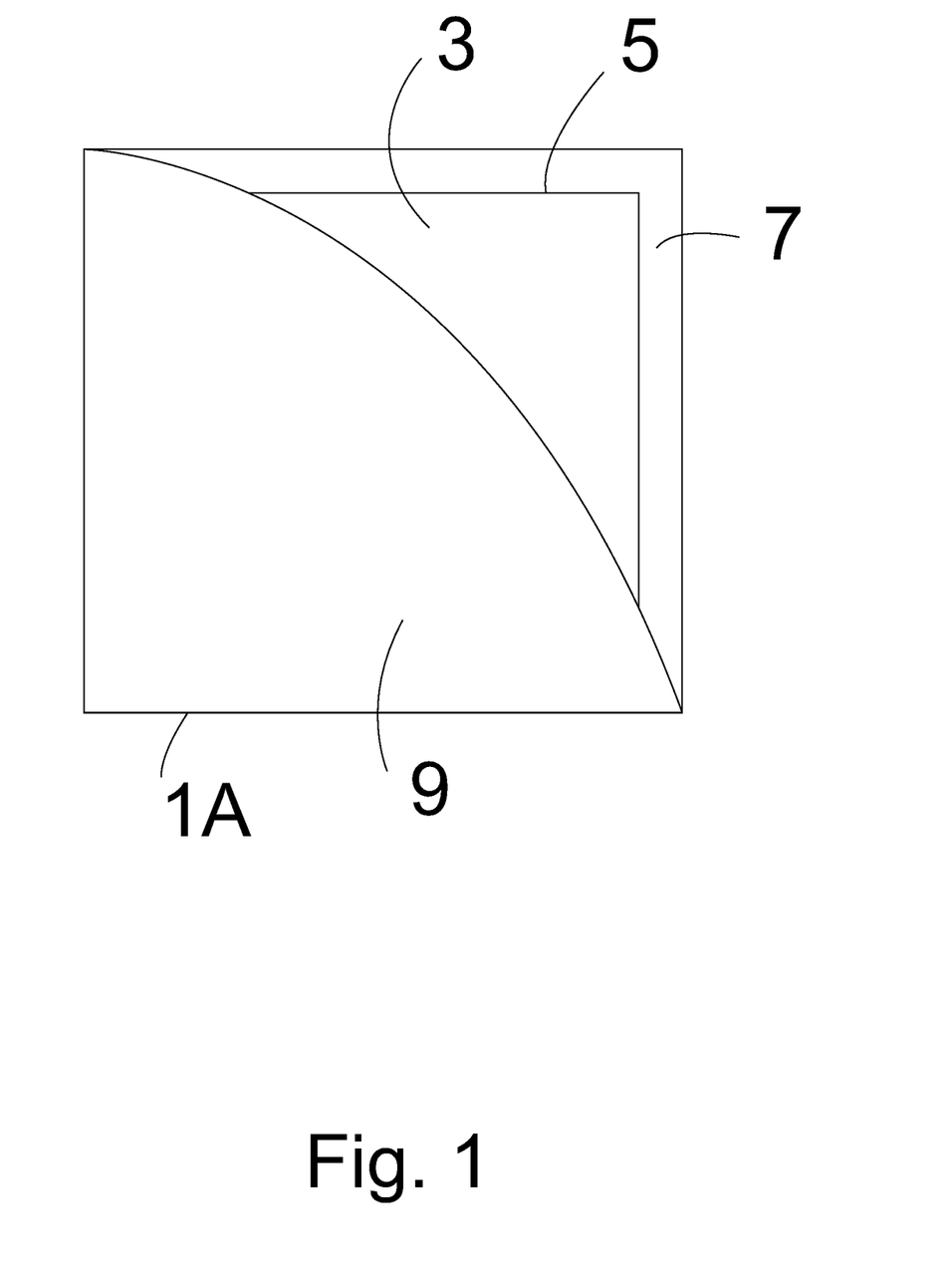
FIG. 1 illustrates a single sheath of the claimed card holder.

Referring to FIG. 1, a first sheath 1A is shown holding an RFID card 3 located in card position. The card position in this embodiment is a slot 5 located within sheath 1A. In this embodiment, means for holding an RFID card in the slot 5 is an attachment between the front of the sheath 9 and the sheath back 11 along at least a portion of their perimeters to form the slot 5. As shown in FIG. 1, first sheath 1A further comprises a protective assembly 7. It will be appreciated that the shape and design of the slot 5 in this embodiment is a matter of design choice, and need not, for example, include the same cutaway design as is illustrated in the shape of the sheath front 9.

While not essential, in a preferred embodiment each sheath will enable the user to identify the RFID card in the card position, whether by a cutaway in the sheath front 9 as shown FIG. 1 or a hole or other aperture in the sheath front 9 that forms the slot 5 in which the RFID card would be located. As an alternative to a leather or synthetic material, a transparent or semi-transparent material can also be used to create a sheath, in which case there is no need for a cutaway or aperture in the sheath front 9 in order to enable the user to quickly identify the correct card to be used in a given application.

Further, it will be appreciated that the RFID card can be held in the card position adjacent the protective assembly 7 by means of an adhesive as opposed to a slot. Further means for positioning an RFID card in the card position adjacent the protective assembly 7 can include a clip or a band fastening the RFID card to the protective assembly 7. In such embodiments, the sheath front 9 may comprise the card position. The sheath back 11 in such embodiments may comprise the conductive layer 17 of the protective assembly 7 or may be a separate material forming the sheath back 11.

Figure 2:
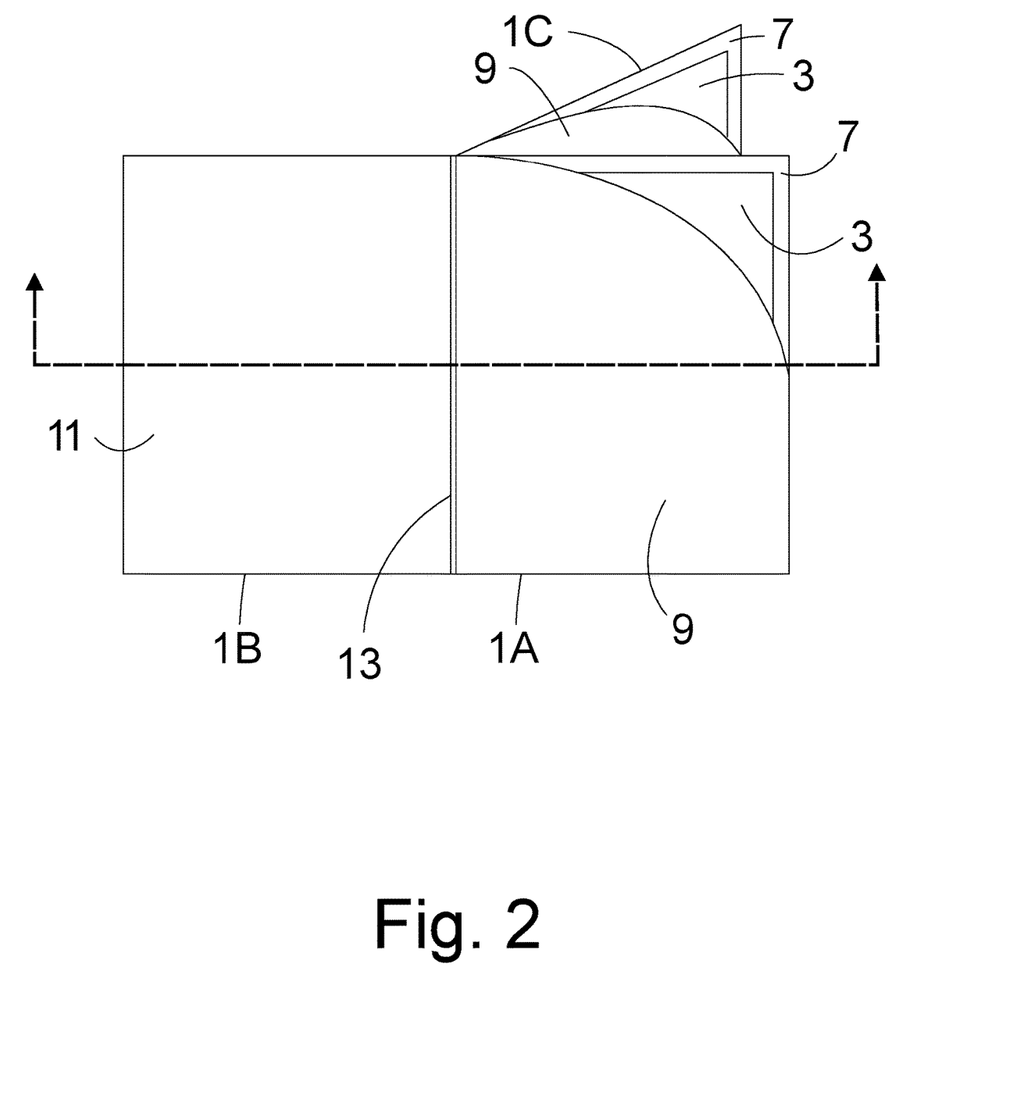
FIG. 2 illustrates several sheaths hingedly connected.

FIG. 2 shows a first sheath 1A joined by a hinged connection 13 to a second sheath 1B and additional sheath 1C between the first sheath 1A and second sheath 1B. As shown, first sheath 1A and second sheath 1B form the outermost sheaths of the claimed holder. The front 9 of first sheath 1A is shown together with the back 11 of second sheath 1B. First sheath 1A, second sheath 1B and additional sheath 1C positioned between sheaths 1A and 1B are all hingedly connected enabling relative motion with respect to each sheath and enabling one side of a card positioned in a sheath to be isolated from other cards within the holder and therefore readable during use. The hinged connection further enables each sheath to be stacked in a first position when the holder is closed. Said hinged connection can be for example a flexible hinge, such as is used in many wallet designs, or a living hinge or a spiral ring. Other hinged connections are possible as is known in the art without departing from the scope of the claimed holder described herein.

Figure 3:
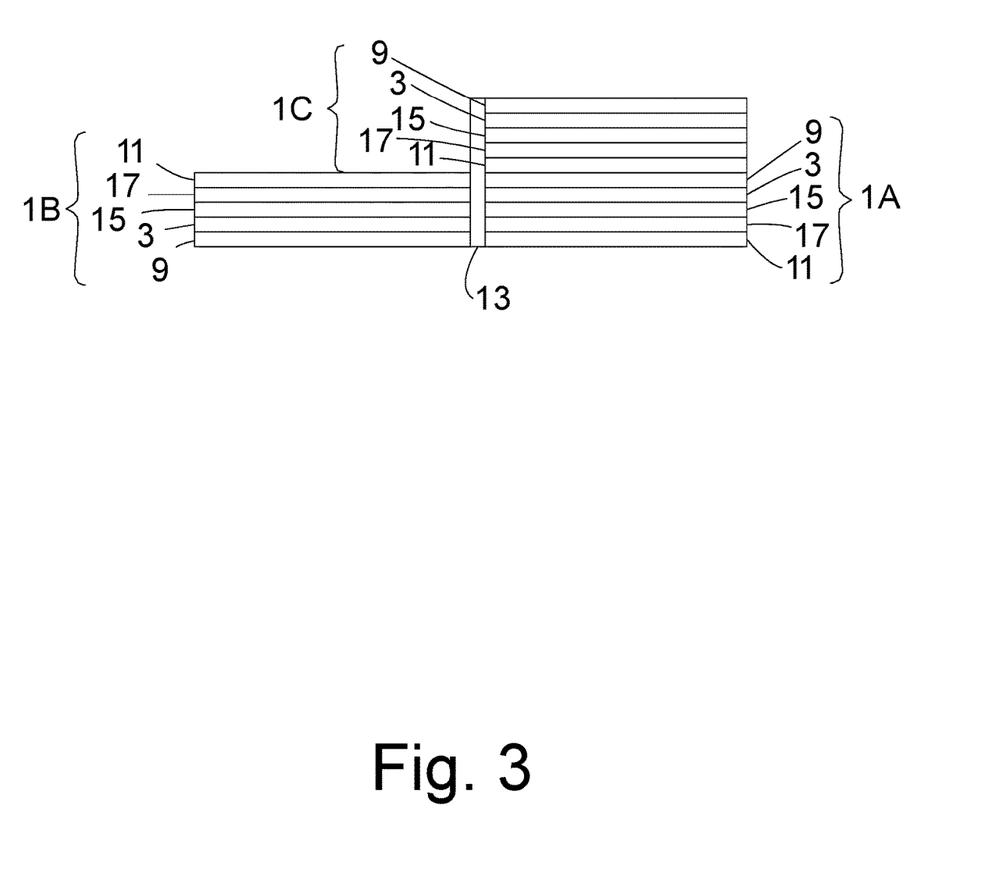
FIG. 3 illustrates a cross section as identified in FIG. 2.

In FIG. 3, a cross section taken as shown in FIG. 2, the component layers of each of the three sheaths is shown. The protective assembly 7 of each sheath comprises an absorbing layer 15 and a conductive layer 17. Preferably, the absorbing layer 15 and the conductive layer 17 are at least coextensive with the size of the slot 5 so as to be coextensive with the size of a card 3 positioned in the slot 5. FIG. 3 further illustrates that one side of a card 3 positioned in the second sheath 1B is isolated for use with a card reader without danger of card clash from the cards held in first sheath 1A and additional sheath 1C. Due to the hinged connection 13, the card positioned in slot 5 of second sheath 1B as shown in FIG. 3 can be isolated and will be readable.

As will be understood, the conductive layer 17 of the protective assembly 7 of each sheath prevents unintended malicious external card reading by scrambling the signal from one side of a card 3 in a sheath. For example, as shown in FIG. 3, the conductive layer 17 in second sheath 1B scrambles the card signal emanating from the side of the card facing the conductive layer 17, while allowing the signal emanating from the other side of that card to be read. Absorbing layer 15 of each sheath, positioned between a card held in the sheath and the conductive layer 17 in each sheath, absorbs the scrambled signal emanating from the side of the card facing the conductive layer 17, enabling the card to be read as intended by the user when the card 3 is isolated from the other cards in the holder. When isolated from the other cards in the holder, one side of the selected card is able to transmit a signal and is readable by the intended card reader.

In one embodiment the conductive layer 17 can be copper mesh, nickel mesh, or other similar electromagnetic shielding materials such as product number 1212 pure copper polyester taffeta fabric, 0.08 millimeters thick, available from lessemf.com. The absorbing layer 15 can be for example product number HFC-A5000, 0.3 millimeters thick, available from emigasket.com. A combined conductive layer and absorber layer can be sourced from mwtmaterials.com as product number MAS-310. It will be appreciated that the absorbing layer can also comprise an air gap or a nonconductive spacer. The purpose of the absorbing layer is to absorb the scrambled signal that is emanating from the conductive layer while the card is being read. Absent the absorbing layer 15, the card could not be read.

Figure 4:
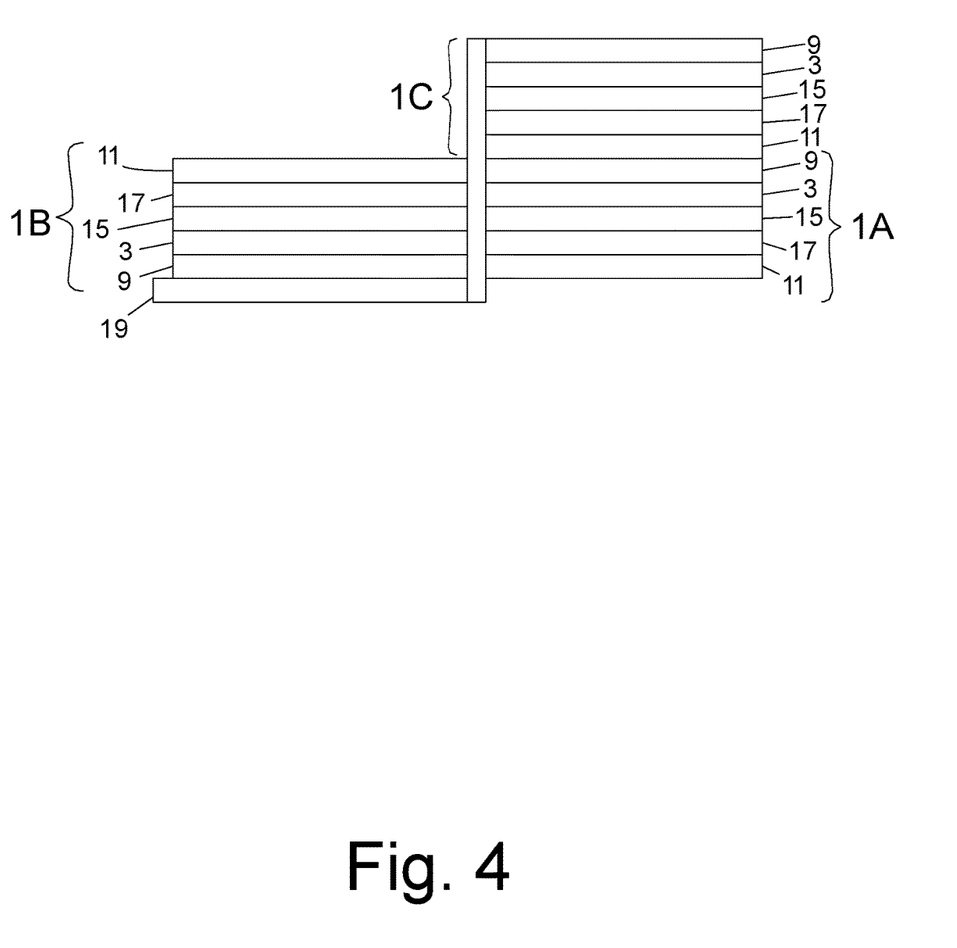
FIG. 4 illustrates an alternate embodiment in cross section of the claimed card holder.

FIG. 4 shows a cross sectional view of an alternate embodiment of the holder described herein. In this embodiment, there is an additional conductive layer 19 hingedly connected to, external to and adjacent the second sheath 1B. This additional conductive layer 19 is made with copper mesh, nickel mesh, or other similar electromagnetic shielding materials as described herein. Preferably this additional conductive layer 19 is larger than the second sheath 1B, as shown in FIG. 4. In this embodiment, it will be appreciated that when the holder is closed and the sheaths are stacked, both sides of all cards in the holder will be bounded with a conductive layer, preventing the card signals from leaving the wallet and thus protecting the cards from malicious data theft. For example, a card in sheath 1B is bounded on one side by the additional conductive layer 19, and on the opposing side by the conductive layer 17 that forms part of the protective assembly 7 of the adjacent internal sheath 1C when the holder is closed and the sheaths are stacked in a first position.

Figure 5:
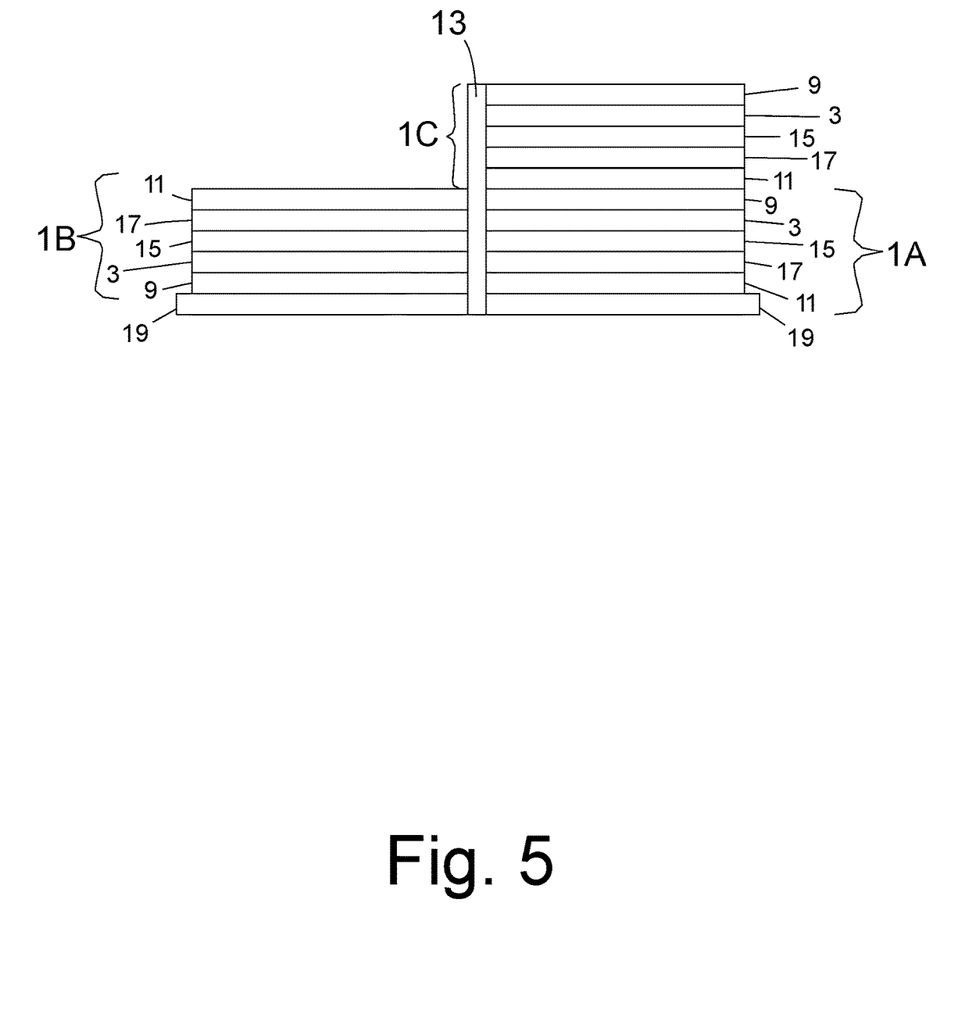
FIG. 5 illustrates yet another embodiment in cross section of the claimed card holder.

FIG. 5 shows a further embodiment of the holder described herein. In FIG. 5, there is an additional conductive layer 19 hingedly connected to, external to and adjacent the first sheath 1A in addition to second sheath 1B. While not essential to providing protection to all cards by bounding both sides of all card slots 5 with a conductive signal scrambling layer when the holder is closed, this additional conductive layer 19 adjacent the first sheath 1A may be done for manufacturing efficiencies or aesthetic purposes, and is again preferably larger than sheath 1A.

Figure 6:
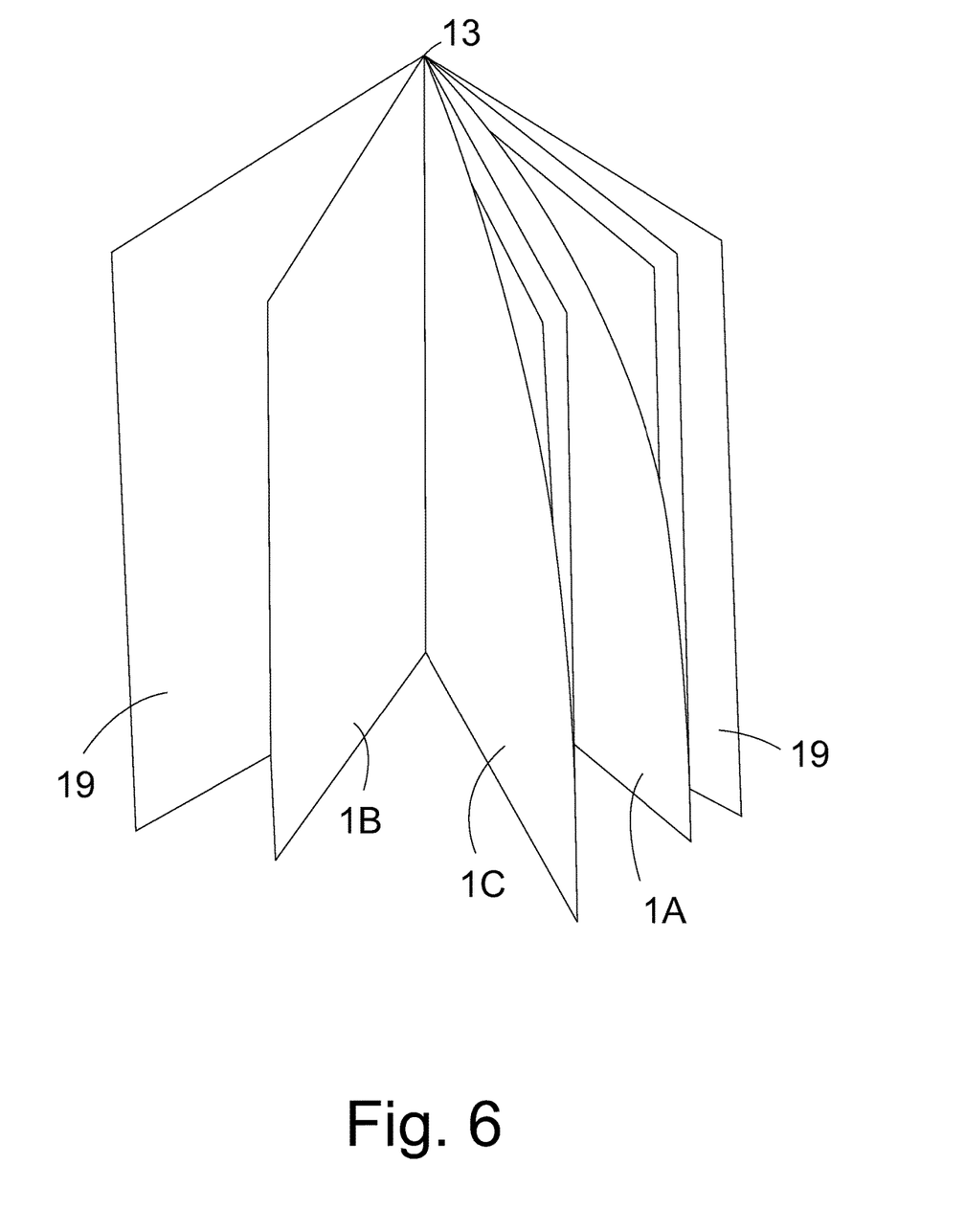
FIG. 6 illustrates the claimed card holder in an open position.

FIG. 6 shows a perspective view of the holder shown in FIG. 5, with the additional conductive layer 19 forming a unitary protective shell about the exterior of the holder.

Figure 7:
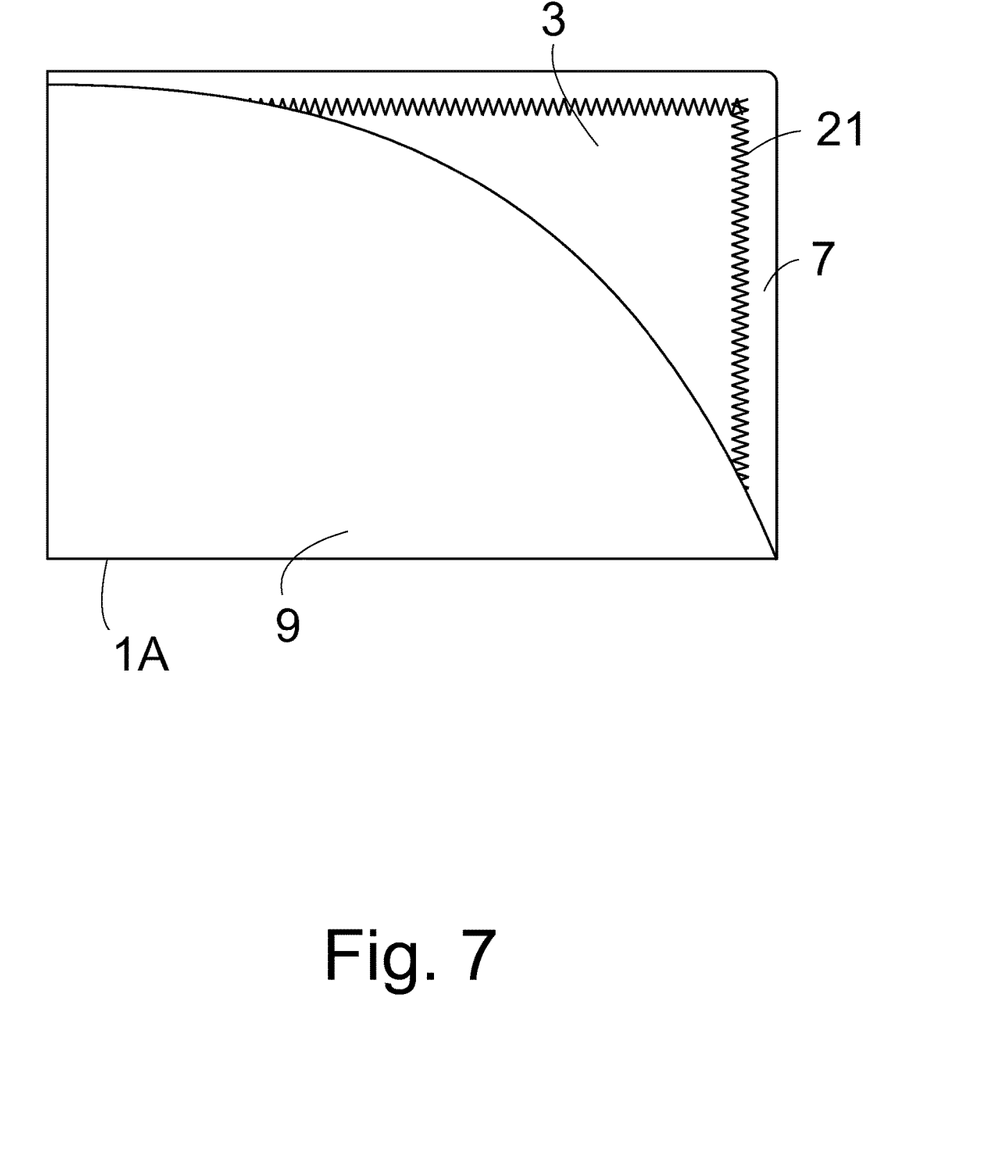
FIG. 7 illustrates a single sheath of an alternate embodiment of the claimed card holder.

FIG. 7 displays a sheath according to a further embodiment of the holder described herein. In this embodiment, the protective assembly 7 is conductively joined to a sheath along at least a portion of the assembly perimeter. This conductive connection can be created using for example metallic fiber 21. In the alternative, the conductive connection can be by way of conductive adhesive or any other method of conductive attachment. This embodiment provides additional protection against malicious card reads of signals emanating from the edges of the cards. The metallic fiber 21 or other conductive connection along at least a portion of the perimeter of the protective assembly would create a signal scrambling or blocking barrier of conductive material along the potentially exposed edges of cards in the holder.

Figure 8:
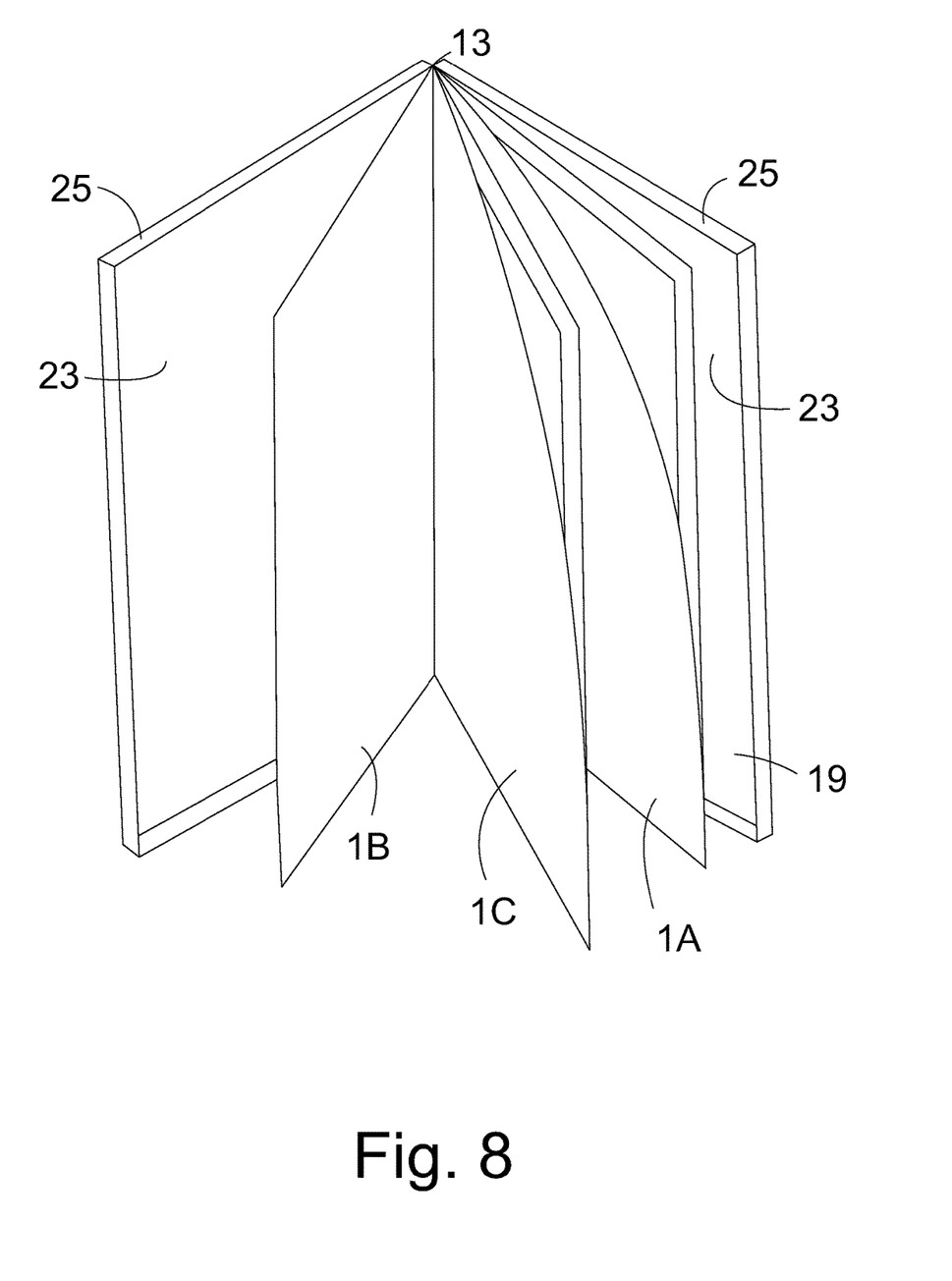
FIG. 8 illustrates another embodiment of the claimed card holder having edges.

In a further embodiment designed to provide additional edge protection against malicious card reads, FIG. 8 shows an encapsulation protective shell 23 having shell edges 25. The encapsulation protective shell 23 comprises copper mesh, nickel mesh, or other similar electromagnetic shielding materials as described herein. In this embodiment, when the holder is closed and the sheaths are stacked in the first position, edges 25 come together to encapsulate the holder when not in use.

Figure 9:
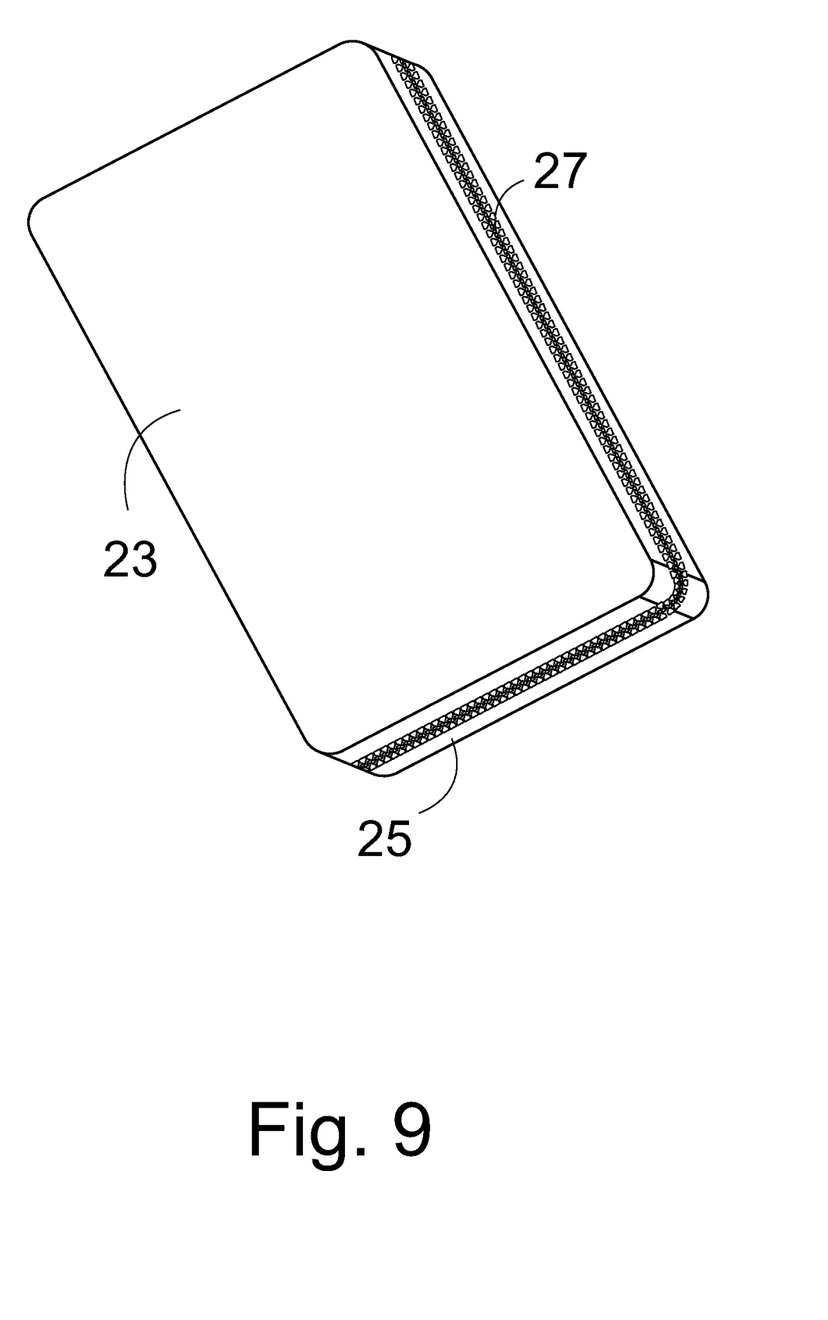
FIG. 9 illustrates another embodiment of the claimed card holder having a zippered closure.

FIG. 9 displays one such embodiment, using a metallic zipper 27 to join the shell edges 25 when the holder is not in use, thereby providing additional signal blocking or scrambling functionality when the holder is not in use.

An embodiment of the holder described herein can be made by providing a first sheet of sheath material consistent with the size of a first sheath 1A and a second sheath 1B. The first sheet has a first half and a second half. A first protective assembly 7 comprising an absorbing layer 15 and a conductive layer 17 is placed upon a first half of said first sheet so that the absorbing layer 15 is adjacent said sheet. A second protective assembly 7 comprising an absorbing layer 15 and a conductive layer 17 is placed upon a second half of said first sheet so that the conductive layer 17 is adjacent said sheet. A second sheet of sheath material coextensive with the size and shape of said first sheet is place on top of said first and second protective assemblies 7. The first and second sheets are joined together about a portion of their perimeters so as to create a slot between the first sheet of sheath material and the first protective assembly, and to also create a slot between the second sheet of sheath material and said second protective assembly 7. A hinged connection is provided along the center axis of said first and second sheets, resulting in first sheath 1A and second sheath 1B.

It will be appreciated that additional sheaths can be added to the holder by repeating the steps outlined above onto the first and second sheaths 1A and 1B respectively. Once a sufficient number of sheaths have been created, electromagnetic signal blocking material for an additional conductive layer 19, or an encapsulation protective shell 23 is placed adjacent sheaths 1A and 1B and a hinged connection between the conductive layer 19 or encapsulation protective shell 23, on the one hand, and the sheaths on the other hand, is provided, preferably along the center axis.

In another embodiment of the holder, it could be made without using a second sheet of sheath material. In this method the sheet still has a first half and a second half. A first protective assembly 7 comprising an absorbing layer 15 and a conductive layer 17 is placed upon the first half of said sheet so the conductive layer is adjacent said sheet. A second protective assembly 7 would be placed under said sheet so the conductive layer is adjacent the sheet. A means for positioning the RFID card to the absorber would then be placed above the first protective assembly and below the second protective assembly. This means could be a clip, band, adhesive, or other device to position the card adjacent the absorber.

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A holder for RFID activated cards comprising:
   at least a first sheath and a second sheath, said first and second sheaths forming the outer most sheaths of said holder;
   each said sheath comprising a front and a back where each has a perimeter, a protective assembly, a card position adjacent said protective assembly, and means for positioning a card adjacent said protective assembly;
   said protective assembly comprising a conductive layer adjacent an absorbing layer, wherein said absorbing layer comprises an absorbing material configured to effect absorption of a scrambled RFID signal, and wherein said absorbing layer is also adjacent said card position, wherein said protective assembly has a perimeter, and wherein said protective assembly further comprises a conductive connection along at least a portion of the perimeter of said assembly;
   and wherein said sheaths are hingedly connected so as to enable relative motion between said sheaths and to enable a card within said holder to be isolated from other cards within said holder and at least one side of the isolated card to be read by a card reader while said isolated card is adjacent said protective assembly, said hinged connection further enabling said sheaths to be stacked in a first position when the cards are not in use.

2. The holder of claim 1, wherein the conductive and absorbing layers of said protective assembly are sized to be at least coextensive with the card position.

3. The holder of claim 1, wherein said card position comprises a slot and said means for positioning comprises an attachment between the front of the sheath and the back of the sheath along at least a portion of their perimeters.

4. The holder of claim 1, wherein said means for positioning is selected from one of the following: a clip, a band, an adhesive, an attachment between the front of the sheath and the back of the sheath along at least a portion of their perimeters.

5. The holder of claim 1, further comprising an additional conductive layer adjacent to and external to said front of said second sheath, said additional conductive layer hingedly connected to said sheaths.

6. The holder of claim 5, further comprising an additional conductive layer adjacent to and external to said back of said first sheath, said additional conductive layer hingedly connected to said sheaths.

7. The holder of claim 6, wherein said additional conductive layers form a unitary protective shell that is at least coextensive with the front of said second sheath and the back of said first sheath.

8. The holder of claim 7, wherein said unitary protective shell further comprises edges that encapsulate the holder when the holder is closed and all sheaths are stacked in the first position.

9. The holder of claim 1, wherein said conductive closure is conductive thread.

10. The holder of claim 1, wherein the back of said sheath comprises the conductive layer of said protective assembly.

11. The holder of claim 1, wherein the absorbing layer comprises an air gap.

12. The holder of claim 1, wherein said sheaths are hingedly connected by a flexible hinge.

13. A method of making a holder for RFID activated cards, said method comprising:
   providing a first sheet of sheath material having a perimeter;
   providing a first and second protective assembly, each comprising an absorbing layer and a conductive layer;

placing a first protective assembly on a first half of said first sheet of material so that said absorbing layer is adjacent said material;

placing a second protective assembly on a second half of said first sheet of material so that said conductive layer is adjacent said sheath material;

placing a second sheet of sheath material having a perimeter on top of said protective assemblies;

joining said first and second sheets of sheath material about a portion of their perimeters so as to create a slot between the first sheet of sheath material and the first protective assembly, and to create a slot between the second sheet of sheath material and the second protective assembly, wherein at least one side of a card within one of said slots can be read by a card reader while said card is adjacent said protective assembly; and hingedly connecting said first and second sheets of sheath material along their center axis creating the two outermost sheaths of said holder.

14. The method of claim 13, further comprising the step of adhering the absorbing layer and the conductive layer of said protective assembly together.

15. A method of making a holder for RFID activated cards, said method comprising:

providing a first sheet of sheath material having a perimeter;

providing a first and second protective assembly, each comprising an absorbing layer and a conductive layer;

placing a first protective assembly on a first half of said first sheet of material so that said conductive layer is adjacent said material;

placing a second protective assembly under a second half of said first sheet of material so that said conductive layer is adjacent said sheath material;

placing two means of positioning a RFID activated card, one atop the first protective assembly and one below the second protective assembly.

\* \* \* \* \*